United States Patent
Bohge et al.

(10) Patent No.: US 11,026,150 B2
(45) Date of Patent: Jun. 1, 2021

(54) HANDOVER PROCESS (71) Applicant: R3—Reliable Realtime Radio Communications GmbH, Berlin (DE)

(72) Inventors: Mathias Bohge, Berlin (DE); Florian Bonanati, Berlin (DE); James Gross, Stockholm (SE)

(73) Assignee: R3—RELIABLE REALTIME RADIO COMMUNICATIONS GMBH, Berlin (DE)

(*) Notice: Subject to any disclaimer, the term of this patent is extended or adjusted under 35 U.S.C. 154(b) by 53 days.

(21) Appl. No.: 16/606,688

(22) PCT Filed: May 3, 2018

(86) PCT No.: PCT/EP2018/061392
§ 371 (c)(1),
(2) Date: Oct. 18, 2019

(87) PCT Pub. No.: WO2018/206402
PCT Pub. Date: Nov. 15, 2018

(65) Prior Publication Data
US 2021/0120474 A1 Apr. 22, 2021

(30) Foreign Application Priority Data
May 12, 2017 (EP) ..................................... 17170773

(51) Int. Cl.
*H04W 4/00* (2018.01)
*H04W 36/32* (2009.01)
*H04W 36/00* (2009.01)

(52) U.S. Cl.
CPC ....... *H04W 36/32* (2013.01); *H04W 36/0083* (2013.01)

(58) Field of Classification Search
CPC .......................... H04W 36/32; H04W 36/0083
(Continued)

(56) References Cited

U.S. PATENT DOCUMENTS

| 5,490,139 A * | 2/1996 | Baker | H04L 45/00 |
| | | | 370/312 |
| 6,775,255 B1 * | 8/2004 | Roy | H04L 29/06027 |
| | | | 370/260 |

(Continued)

FOREIGN PATENT DOCUMENTS

DE 10 2012 206 529 A1 10/2013
JP 2004-312665 A 11/2004

OTHER PUBLICATIONS

Yuanguo Bi et al; "A Multi-Channel Token Ring Protocol for QoS Provisioning in Inter-Vehicle Communications"; IEEE Transactions of Wireless Communications; vol. 8; No. 11; Nov. 2009; pp. 5261-5631.

(Continued)

Primary Examiner — Amancio Gonzalez
(74) Attorney, Agent, or Firm — Gordon Rees Scully; Mansukhani, LLP (57) ABSTRACT

An embodiment of the invention relates to a method of carrying out a handover process. After receiving a handover message (HOM(13)) that indicates the initiation of the handover process with respect to a moving node (13), a handover control node (20) addresses its next token (T(21)) to the moving node (13) and not to its formerly allocated downstream node (21) in its original wireless token ring system (2). In case that the moving node (13) receives said token (T(21)) and sends thereafter an acknowledgement to the handover control node (20) and an own token (T) to its allocated downstream node (21) in the enlarged wireless token ring system (2), the handover process is deemed to be completed and the moving node (13) forms the newly allocated downstream node to the handover control node (20) in the enlarged wireless token ring system (2). In case that the handover control node (20) does not receive the acknowledgement in a given period of time, the handover (Continued)

control node (20) sends a replacement token (RT) to the allocated downstream node (21) of the moving node (13), the replacement token (RT) replacing the presumably missing token of the moving node (13) and allowing the token ring communication to proceed.

17 Claims, 10 Drawing Sheets

(58) Field of Classification Search
USPC .......................................................... 370/331
See application file for complete search history.

(56) References Cited

U.S. PATENT DOCUMENTS

| 6,859,448 B1* | 2/2005 | Roy | ......................... | H04W 8/02 |
| | | | | 370/338 |
| 2009/0055909 A1* | 2/2009 | Cheng | .................... | H04L 12/433 |
| | | | | 726/6 |

OTHER PUBLICATIONS

Mustafa Ergen; "WTRP-Wireless Token Ring Protocol"; B.S. Middle East Technical University; A thesis submitted in partial satisfaction of the Master of Science in the Electric Engineering and Computer Science in the Graduate Division of the University of California, Berkeley; Jan. 1, 2002; 127 pages.

European Search Report dated Oct. 26, 2017 issued in related EP Application No. 17170773.0; filed May 12, 2017.

International Search Report dated Jul. 17, 2018 issued in related PCT/EP2018/061392; filed May 3, 2018.

* cited by examiner

HANDOVER PROCESS

The invention relates to a method of carrying out a handover process between communication systems. The invention also relates to arrangements comprising communication systems, wireless token ring systems and communication nodes for wireless token ring systems.

BACKGROUND OF THE INVENTION

German Patent Application DE 10 2012 206 529 A1 discloses a method of operating a token-ring system where communication nodes send signals to allocated upstream communication nodes and receive signals from allocated downstream communication nodes.

The thesis "WTRP—Wireless Token Ring Protocol" (M. Ergen, Berkeley, Calif., 2002) discloses a method allowing a communication node to join an existing communication system.

OBJECTIVE OF THE PRESENT INVENTION

An objective of the present invention is to provide a method for handling a handover process between a wireless token ring system and another communication system with minimal impact on the ongoing communication between nodes that are not directly involved in the handover process.

A further objective of the present invention is to provide arrangements comprising communication systems, wireless token ring systems and communication nodes for wireless token ring systems that can handle handover processes with minimal impact on the ongoing communication between nodes that are not directly involved in the handover process.

BRIEF SUMMARY OF THE INVENTION

An embodiment of the invention relates to a method of carrying out a handover process between a first communication system and a second communication system, wherein the second communication system is a wireless token ring system and at least one communication node of the wireless token ring system operates as a handover control node, and wherein a communication node, hereinafter referred to as the moving node, of the first communication system leaves the first communication system and is integrated into the wireless token ring system thereby transforming the original wireless token ring system into an enlarged wireless token ring system. After receiving a handover message that indicates the initiation of the handover process with respect to the moving node, the handover control node addresses its next token to the moving node and not to its formerly allocated downstream communication node in the original wireless token ring system, and (a) in case that the moving node receives said token and sends thereafter an acknowledgement to the handover control node and an own token to its allocated downstream node in the enlarged wireless token ring system, the handover process is deemed to be completed and the moving node forms the newly allocated downstream node to the handover control node in the enlarged wireless token ring system, and (b) in case that the handover control node does not receive the acknowledgement in a given period of time, the handover control node sends a replacement token to the allocated downstream node of the moving node, the replacement token replacing the presumably missing token of the moving node and allowing the token ring communication to proceed.

Steps (a) and (b) are repeated until the handover control node receives the acknowledgement from the moving node or until the handover process is deemed to have failed and is aborted.

An advantage of this embodiment of the invention is that the token-based communication between the nodes in the wireless token ring system may proceed without disruption during the handover phase even if the handover process is delayed or finally fails completely.

Preferably, the handover process is deemed to have failed and is aborted after the handover control node of the wireless token ring system has sent a predefined number of replacement messages.

In step (a) the acknowledgement and the moving node's token that is sent to its allocated downstream node in the enlarged wireless token ring system, may be separate signals that are sent simultaneously or consecutively by the moving node.

Alternatively or additionally, the moving node's token itself may form the acknowledgement, and the handover control node may accept the receipt of the moving node's token that is addressed to its allocated downstream node in the enlarged wireless token ring system, as the receipt of the acknowledgement.

According to a preferred embodiment, said next token of the handover control node may indicate to the moving node which node of the wireless token ring system will be its allocated downstream node in the enlarged wireless token ring system.

In each of the two communication systems, preferably at least one node operates as a handover control node. The handover control node of the first communication system is hereinafter referred to as first handover control node and the handover control node of the wireless token ring system is hereinafter referred to as second handover control node.

The handover message that indicates the initiation of the handover process with respect to the moving node, is preferably sent by the first handover control node to the second handover control node.

According to a further embodiment, the second handover control node may send a configuration message to the first handover control node which forwards the configuration message to the moving node. The configuration message preferably indicates to the moving node which node of the wireless token ring system will be its allocated downstream node in the enlarged wireless token ring system.

Upon receipt of the handover message, the handover control node of the wireless token ring system preferably sends an enlargement information that indicates the enlargement of the wireless token ring system to the communication nodes of the wireless token ring system.

The enlargement information may be forwarded by a token from communication node to communication node inside the wireless token ring system. Alternatively or additionally, the enlargement information may be simultaneously sent via a broadcast signal from the handover control node of the wireless token ring system to all other communication nodes of the wireless token ring system.

Further, upon receipt of the handover message, the handover control node of the wireless token ring system preferably sets a new timing schedule and sends the new timing schedule to the communication nodes of the wireless token ring system. The new timing schedule preferably defines the timing demands that have to be met by the communication nodes in the enlarged wireless token ring system.

The new timing schedule may be forwarded by a token from communication node to communication node inside the wireless token ring system. Alternatively or additionally, the new timing schedule may be simultaneously sent via a broadcast signal from the handover control node of the wireless token ring system to all other communication nodes of the wireless token ring system.

The new timing schedule may be defined by or may at least also define the token holding times of the communication nodes of the wireless token ring system.

In each rotation period or rotation cycle of the token ring, each communication node of the wireless token ring system may directly or indirectly—i.e. via one or more other communication nodes that function as relay nodes—send a token to an allocated downstream communication node of the wireless token ring system and may receive a token from an allocated upstream communication node of the wireless token ring system.

The first communication system may also be a wireless token ring system. In each rotation period, each communication node of the first communication system may directly or indirectly—i.e. via one or more other communication nodes that function as relay nodes—send a token to an allocated downstream communication node of the first communication system and may receive a token from an allocated upstream communication node of the first communication system.

A further embodiment of the invention relates to an arrangement comprising at least two communication systems. At least one of the communication systems is a wireless token ring system, and at least one of the communication nodes of the wireless token ring system is configured to act as a handover control node according to the handover method described above.

A further embodiment of the invention relates to a wireless token ring system. A handover control node of the wireless token ring system is preferably configured to address its next token to a moving node and not to its formerly allocated downstream communication node in its original wireless token ring system, after receiving a handover message that indicates the initiation of the handover process with respect to the moving node, and to send a replacement token to the allocated downstream node of the moving node, in case that the handover control node did not receive an acknowledgement from the moving node in a given period of time. The replacement token allows the token ring communication to proceed.

A further embodiment of the invention relates to a communication node for a wireless token ring system. The communication node is configured to act as a handover control node according to the handover method described above.

The handover control node is preferably configured to address its next token to a moving node and not to its formerly allocated downstream communication node in its original wireless token ring system, after receiving a handover message that indicates the initiation of the handover process with respect to the moving node, and to send a replacement token to the allocated downstream node of the moving node in case that the handover control node did not receive an acknowledgement from the moving node in a given period of time. The replacement token allows the token ring communication to proceed.

The communication node preferably comprises a transceiver, a processor and a memory that stores a handover control software module which—after activation—programs the processor such that the communication node acts as the handover control node.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
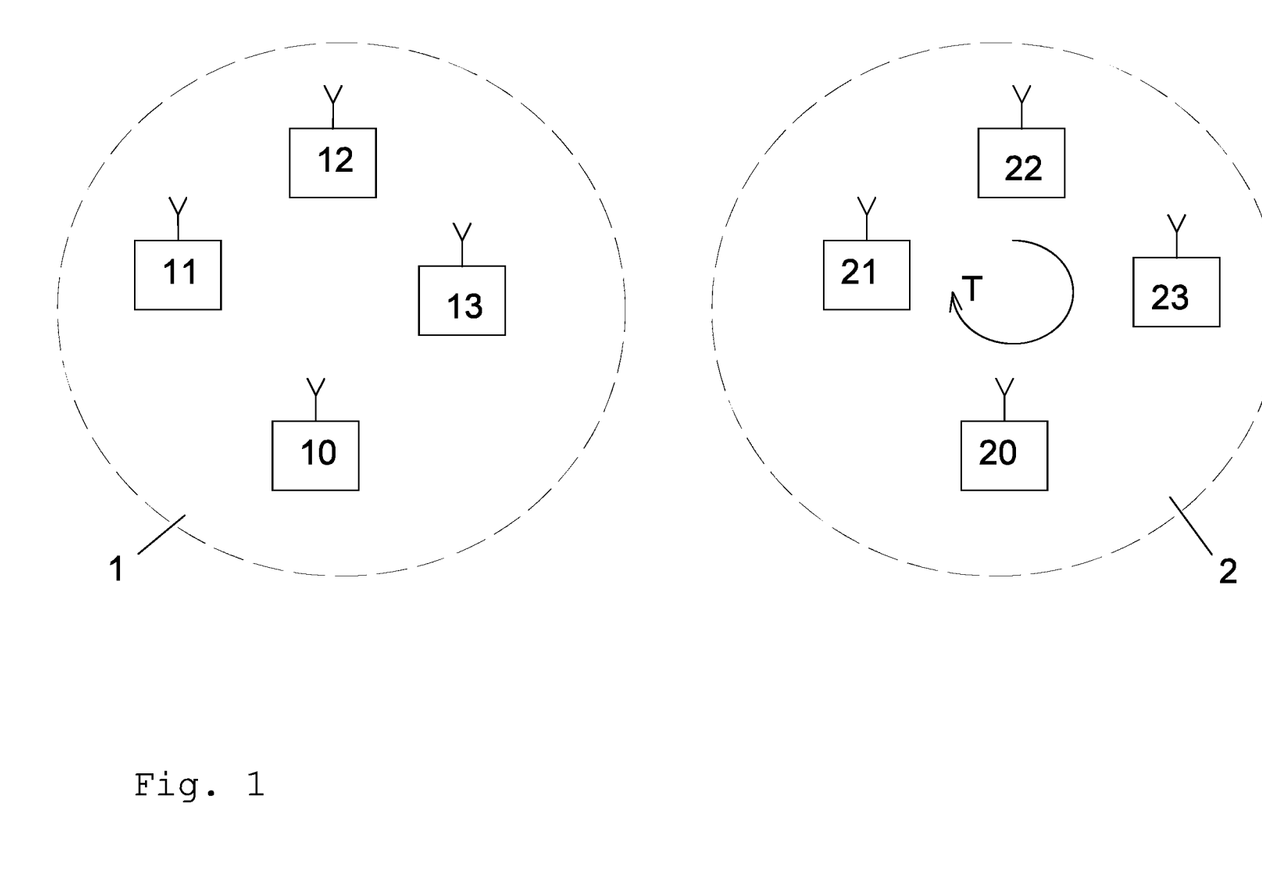
FIG. 1-5 illustrates an exemplary embodiment of a handover process in an arrangement that comprises two communication systems.

FIG. 1 illustrates an arrangement comprising a first communication system 1 and a second communication system.

The second communication system is a wireless token ring system 2. In each rotation period of the wireless token ring system, each communication node 20-23 of the wireless token ring system directly or indirectly—i.e. via one or more other communication nodes that function as relay nodes—sends a token T to an allocated downstream communication node of the wireless token ring system and receives a token from an allocated upstream communication node of the wireless token ring system. In FIG. 1, an arrow visualizes the assignment of upstream and downstream nodes with respect to one another.

Hereinafter it is assumed that the communication node 20 is configured to act as a handover control node in case that a communication node of another communication system intends to join the wireless token ring system 2.

The first communication system 1 may be based on any communication standard known in the art. For instance, the first communication system 1 may also be a wireless token ring system. In this case, in each rotation period, each communication node 10-13 of the first communication system 1 sends a token to an allocated downstream communication node and receives a token from an allocated upstream communication node.

Figure 2:
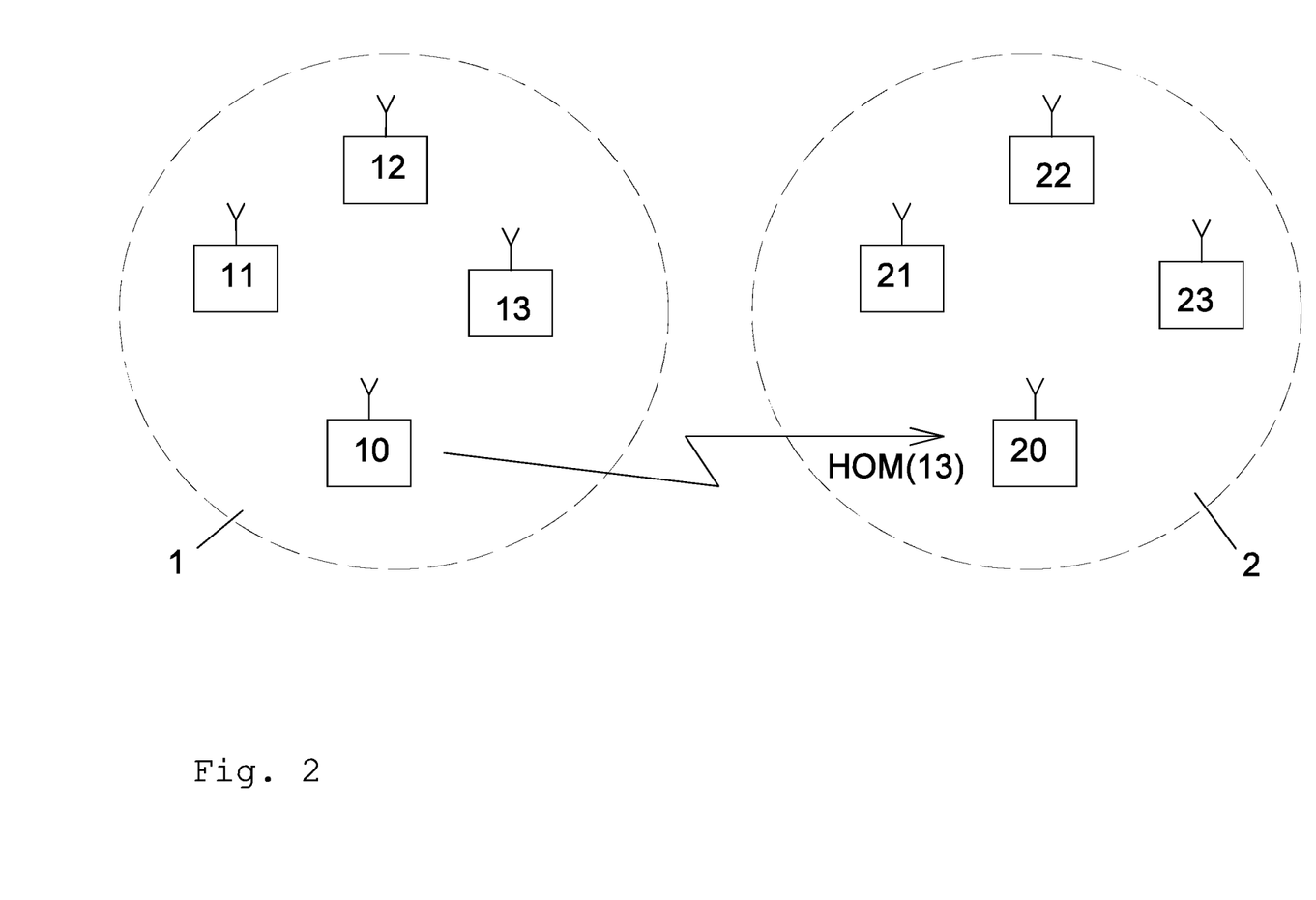

Hereinafter, a preferred embodiment of a handover process between both communication systems 1 and 2 will be described in further detail. It is assumed that the communication node 13 of the first communication system 1 intends to leave the first communication system 1 and join the wireless token ring system 2. The communication node 13 will be referred to as the moving node 13.

The initiation of the handover process will be communicated to the handover control node 20 of the wireless token ring system 2 by a handover message HOM(13). The handover message HOM(13) indicates the moving node 13 (see FIG. 2).

The handover message HOM(13) can be sent by any of the communication nodes 10-13 of the first communication system 1, for instance by the moving node 13 itself. In case that the first communication system 1 comprises a handover control node, the handover message HOM(13) is preferably sent by the handover control node. In FIG. 1, it is assumed that the communication node 10 is a handover control node of the communication system 1 and therefore sends the handover message HOM(13) to the handover control node 20 of the wireless token ring system 2 (see FIG. 2).

Figure 3:
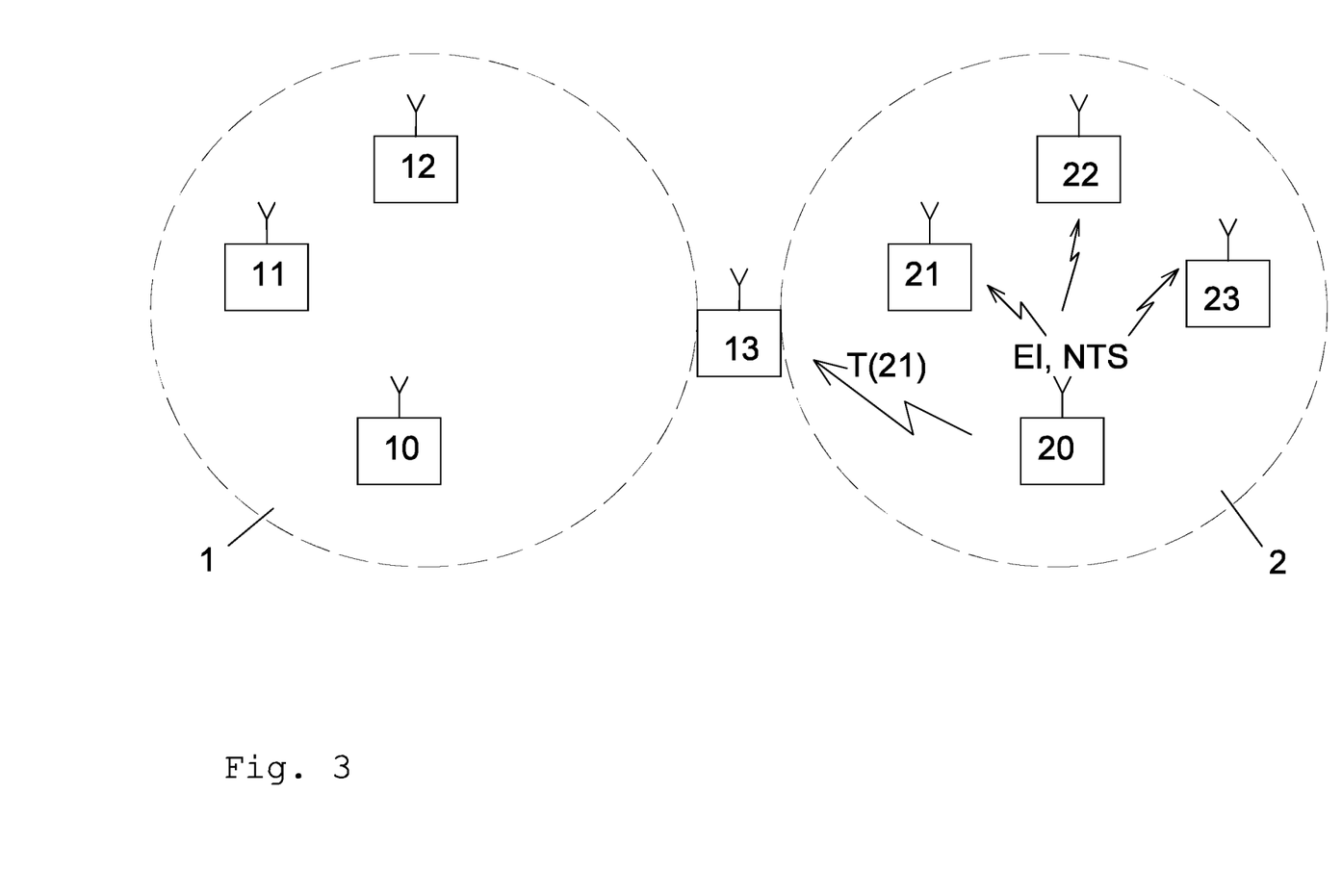

After receiving the handover message HOM(13) the handover control node 20 of the wireless token ring system 2 addresses its next token T(21) to the moving node 13 and not to its formerly allocated downstream communication node 21 in the original wireless token ring system 2 (see FIG. 3). This next token T(21) contains the information that the communication node 21 is the downstream node allocated to the moving node 13 in the enlarged wireless token ring system 2.

Figure 4:
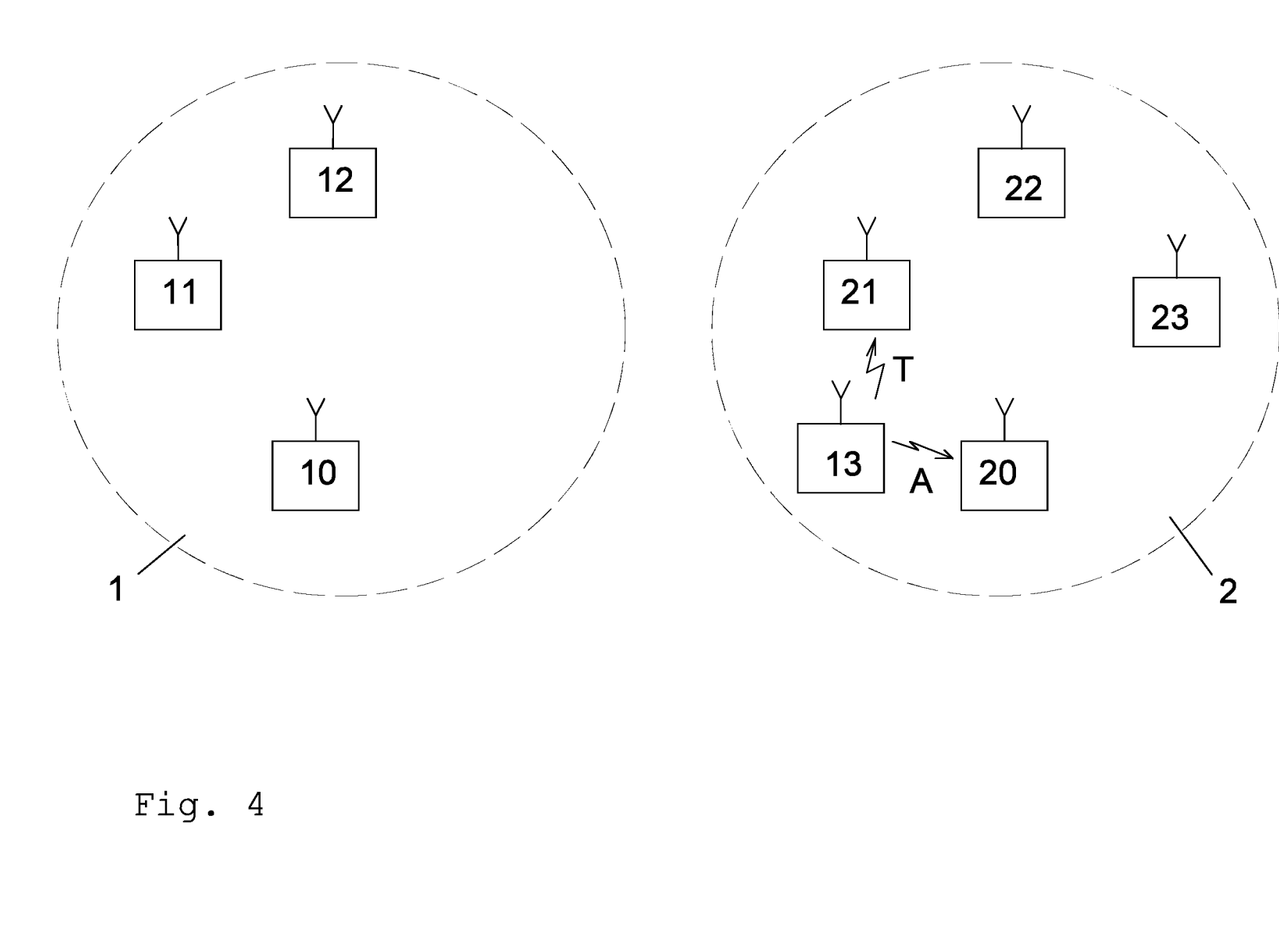

In case that the moving node 13 receives the token T(21) and sends thereafter an acknowledgement signal A to the handover control node and an own token T to its allocated downstream node 21 in the enlarged second token ring system 2, the handover process is deemed to be completed and the moving node 13 forms the newly allocated downstream node of the handover control node 10 in the enlarged wireless token ring system 2 (see FIG. 4).

Figure 5:
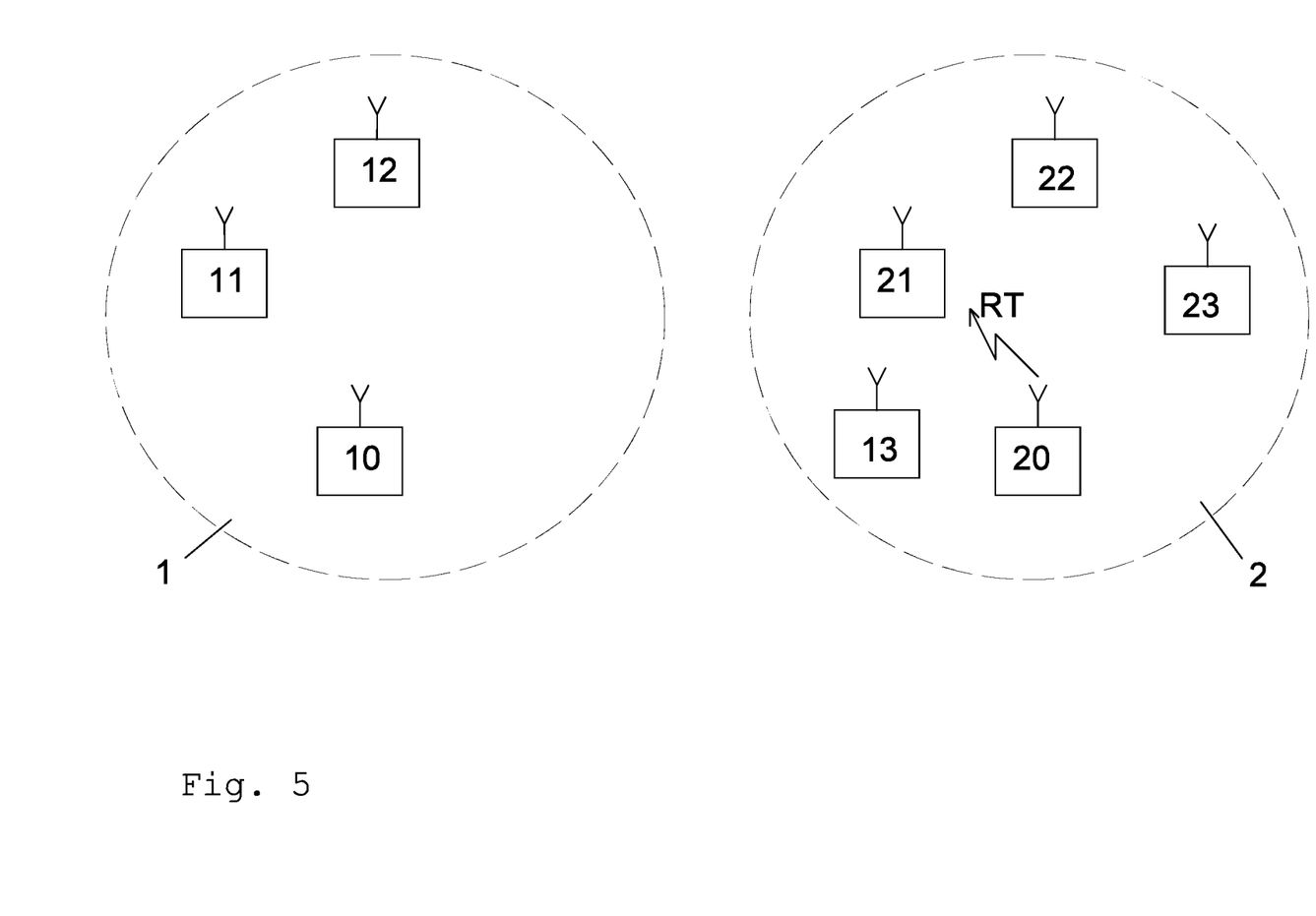

In case that the handover control node 20 does not receive the acknowledgement signal A in a given period of time, the handover control node 20 assumes that the moving node 13 has not received the token T(21) and therefore has not sent an own token T to the allocated downstream node 21 of the moving node 13 (see FIG. 5). In order to allow the token ring communication in the wireless token ring system 2 to proceed, the handover control node 20 sends a replacement token RT to the allocated downstream node 21 of the moving node 13. The replacement token RT replaces the presumably missing token T of the moving node 13 and allows the other communication nodes 21-23 of the wireless token ring system 2 to uphold the token-based communication.

The handover control node 20 repeats the above described steps of sending the token T(21) to the moving node 13 and awaiting the acknowledgement signal A until the handover control node 20 receives the acknowledgement signal A from the moving node 13 or until the handover process is deemed to have failed and is aborted. Preferably, the handover process is deemed to have failed and is aborted after the handover control node 20 of the wireless token ring system 2 has sent a predefined number (e.g. 100) of replacement tokens RT without success.

Referring again to FIG. 3, it can be seen that the handover control node 20 of the wireless token ring system 20 may send an enlargement information EI to the communication nodes 21-23 of the wireless token ring system 2. The enlargement information EI indicates the imminent or already implemented enlargement of the wireless token ring system 2. The enlargement information EI may be transmitted upon receipt of the handover message HOM(13).

The enlargement information EI may be forwarded by a token from communication node to communication node inside the wireless token ring system 2 (see FIG. 1). Alternatively or additionally, the enlargement information EI may be simultaneously sent via a broadcast signal from the handover control node 20 of the wireless token ring system 2 to all other communication nodes 21-23 of the wireless token ring system 2. The enlargement information EI is preferably sent before the token T(21) is transmitted to the moving node 13.

Further, upon receipt of the handover message HOM(13) the handover control node 20 of the wireless token ring system 2 may set a new timing schedule NTS and send the new timing schedule NTS to the communication nodes 21-23 of the wireless token ring system 2 as well as to the moving node 13. The new timing schedule preferably defines the timing demands that have to be met by the communication nodes 13, 21-23 in the enlarged wireless token ring system 2.

The new timing schedule NTS may be forwarded by a token from communication node to communication node inside the enlarged wireless token ring system 2. Alternatively or additionally, the new timing schedule NTS may be simultaneously sent via a broadcast signal from the handover control node 20 to the communication nodes 13 and 21-23.

The new timing schedule NTS may be defined by or may at least also define the token holding times of the communication nodes in the wireless token ring system 2.

Figure 6:
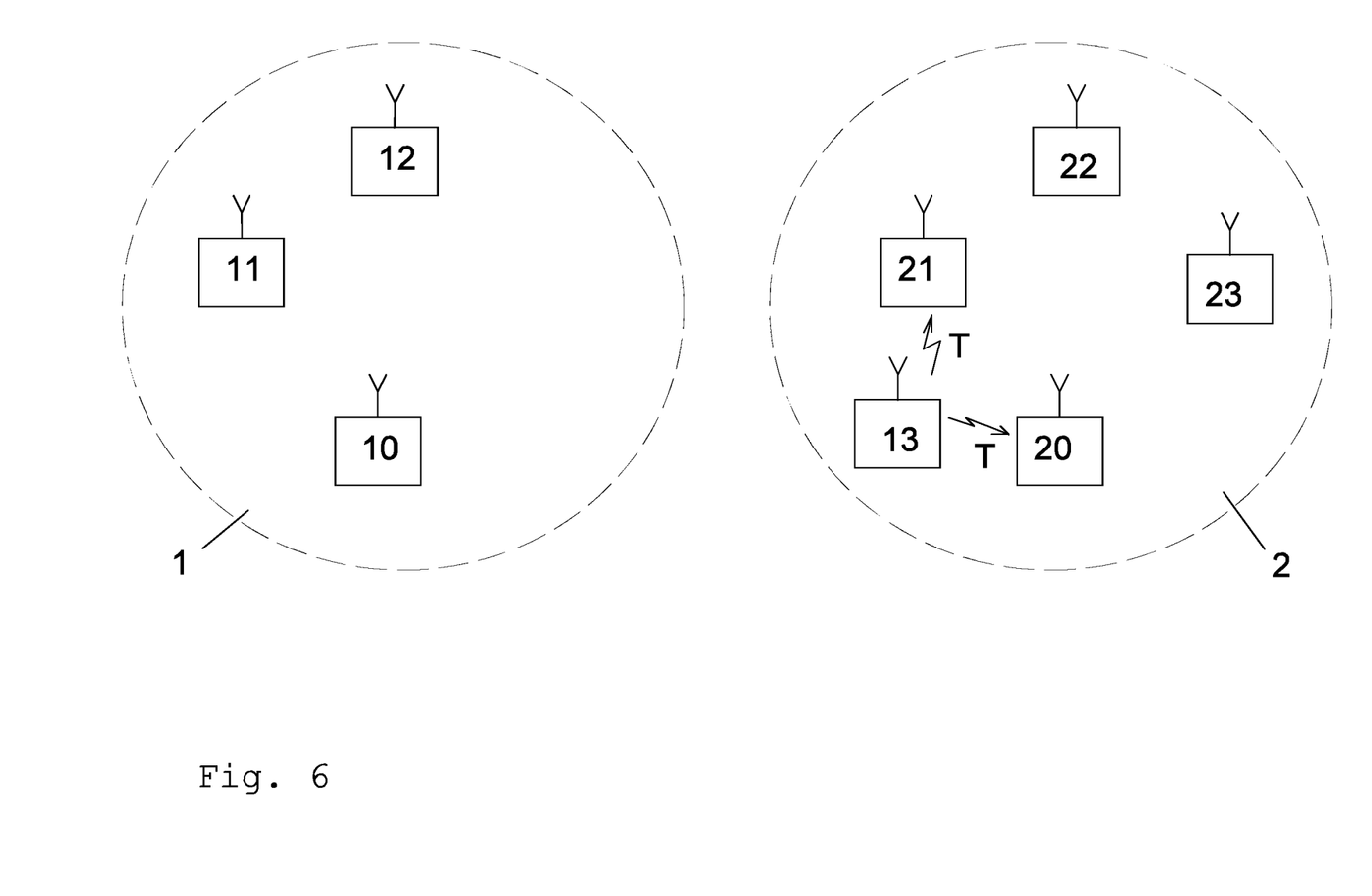
FIG. 6 illustrates a modification of the handover process shown in FIGS. 1-5.

FIG. 6 illustrates a modification of the handover process described above. After receiving the token T(21), the moving node 13 only sends an own token T to its allocated downstream node 21 in the enlarged second token ring system 2, but no additional acknowledgement signal A. Since the token T is transmitted wirelessly, is can also be received by the handover control node 20 which accepts the receipt of the moving node's token T as the required acknowledgement. In other words, in the embodiment of FIG. 6, the moving node's token T that is addressed to the communication node 21, also forms the acknowledgement for the handover control node 20.

In case that the handover control node 20 does not receive the token T from the moving node 13 in a given period of time, the handover control node 20 assumes that the moving node 13 has not received the token T(21) (see FIG. 3). In order to allow the token ring communication in the wireless token ring system 2 to proceed, the handover control node 20 sends a replacement token RT to the allocated downstream node 21 of the moving node 13 as shown in FIG. 5.

The handover control node 20 repeats the above described steps of sending a token T(21) to the moving node 13 and awaiting the implicit acknowledgement that is conveyed by the moving node's 13 token T, until the handover control node 20 receives this token T from the moving node 13 or until the handover process is deemed to have failed and is aborted.

Figure 7:
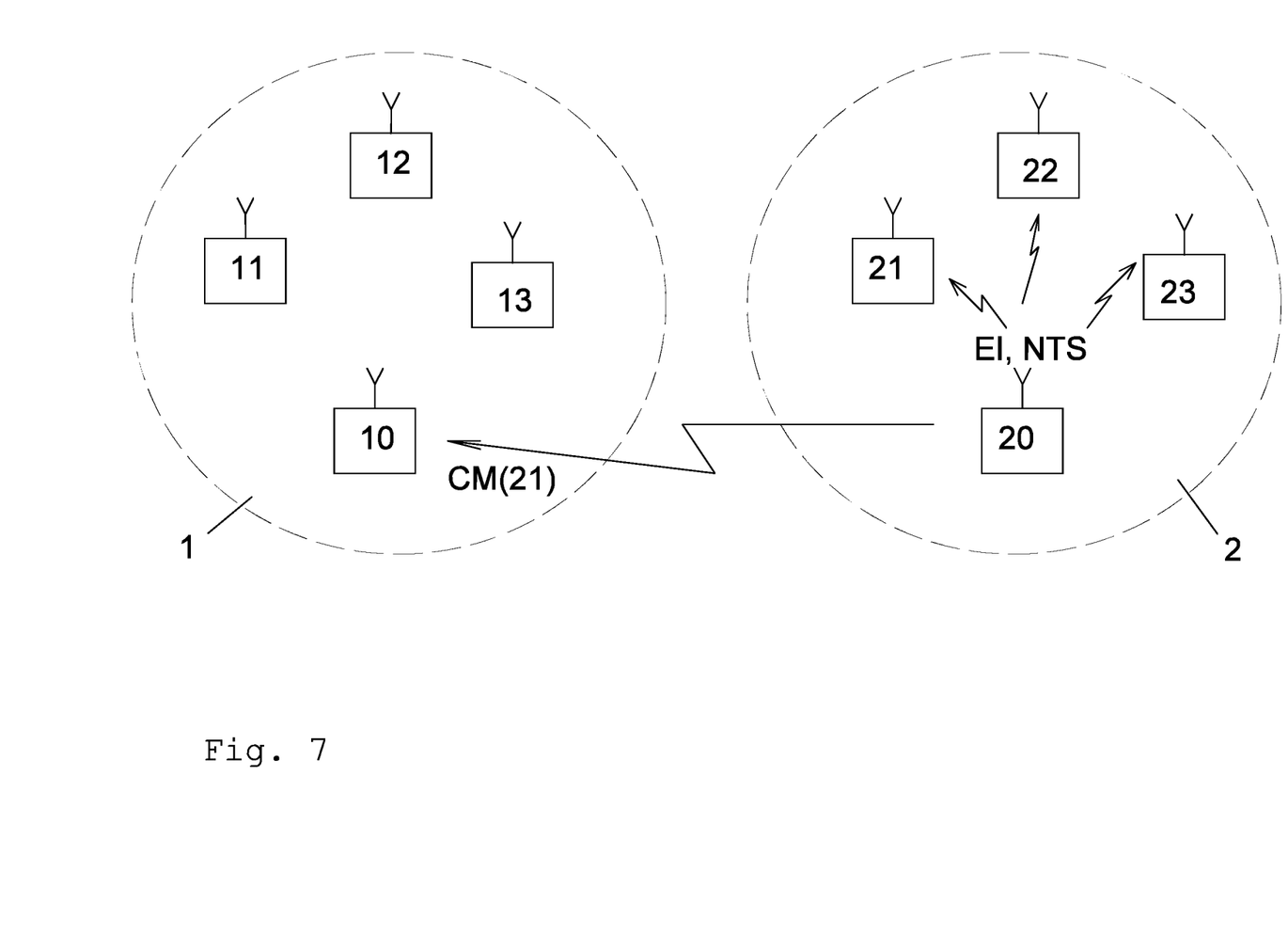
FIG. 7-9 illustrates a further modification of the handover process shown in FIGS. 1-5.
Figure 8:
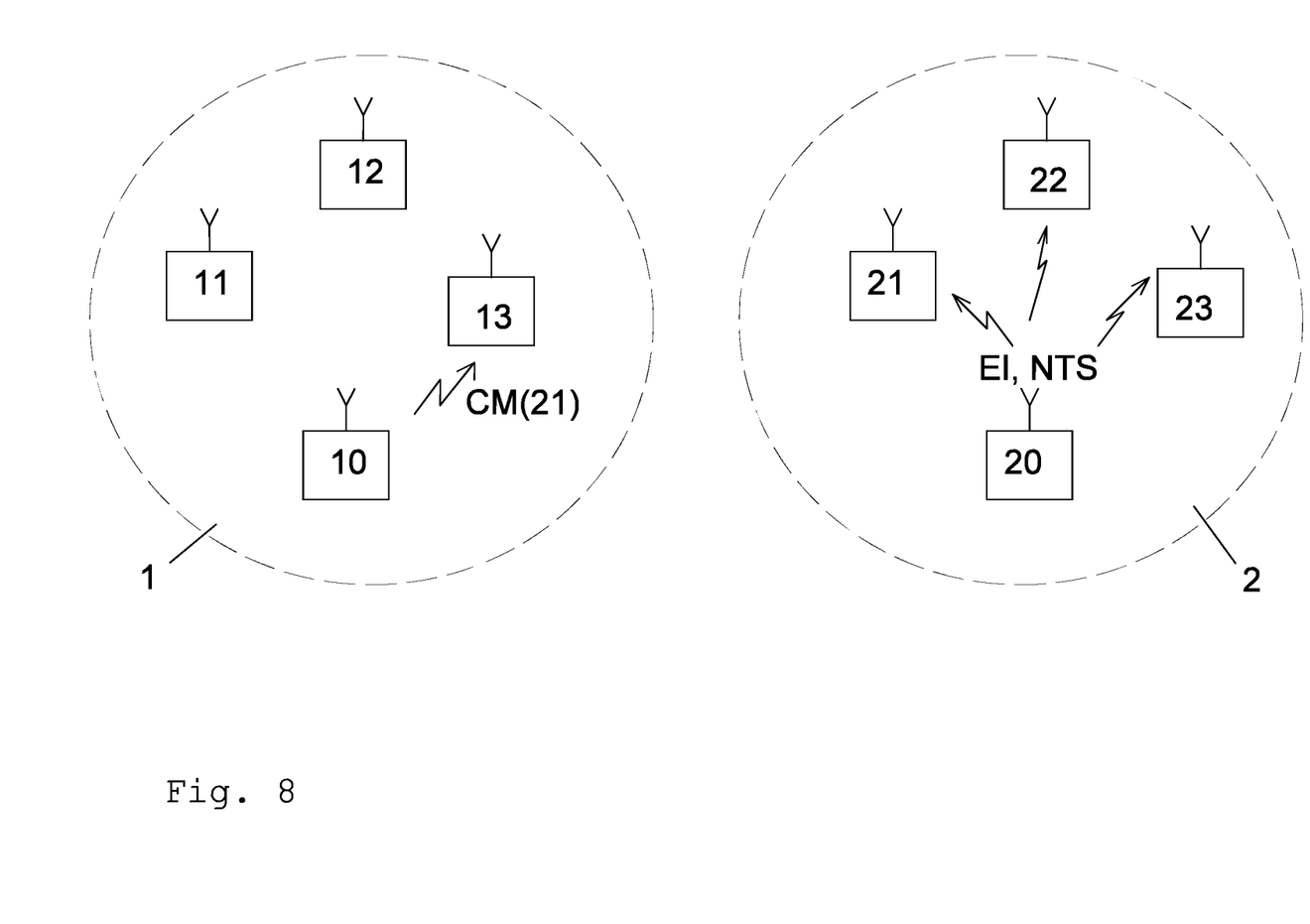
Figure 9:
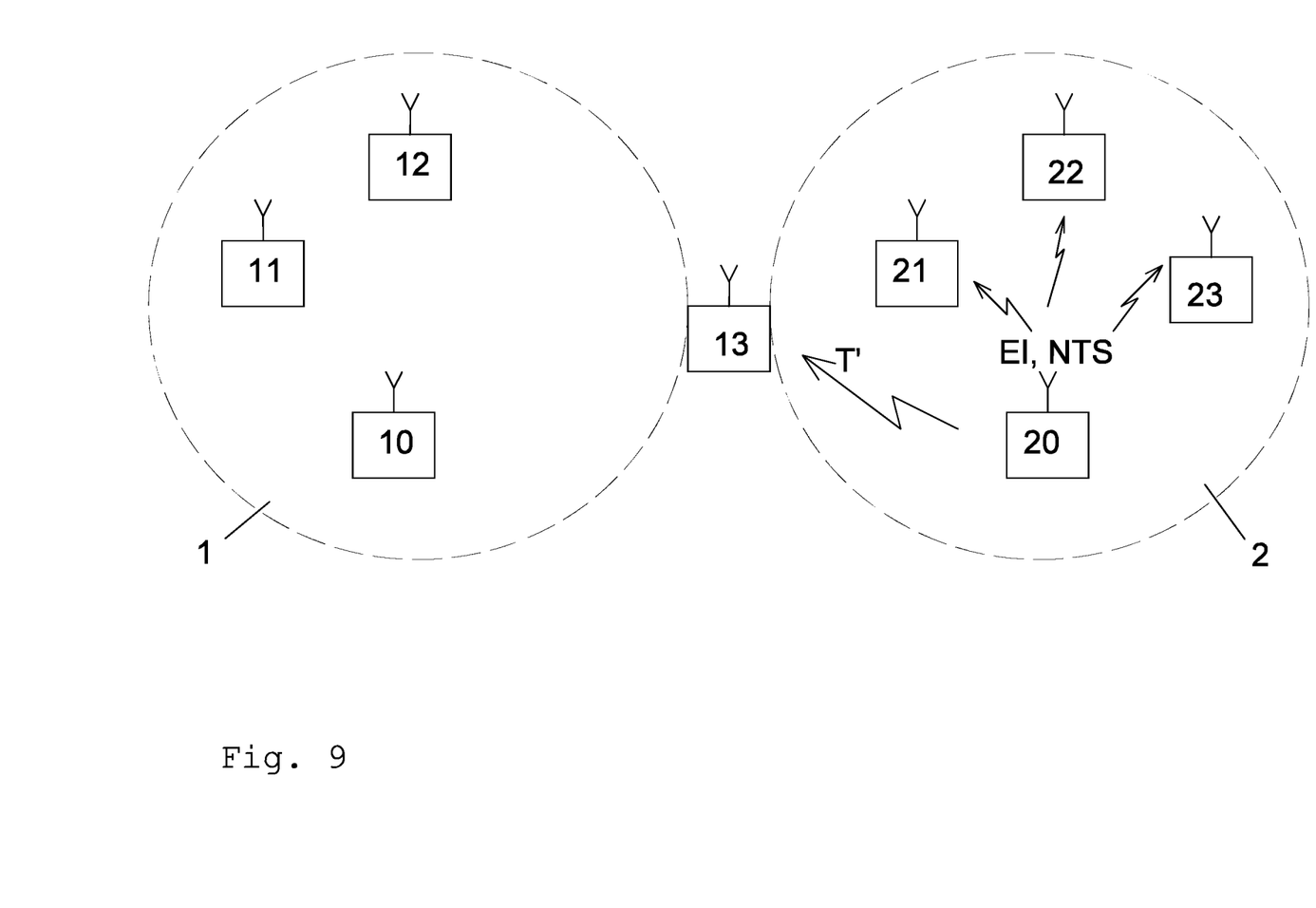

FIGS. 7-9 illustrate a further modification of the handover process described above with reference to FIG. 1-5. After receiving the handover message HOM(13) from the handover control node 10 of the communication system 1, the handover control node 20 of the wireless token ring system 2 responds with a configuration message CM(21) (see FIG. 7).

The handover control node 10 of the communication system 1 forwards the configuration message CM(21) to the moving node 13 (see FIG. 8). The configuration message C(21) indicates to the moving node 13 that the communication node 21 of the wireless token ring system 2 will be its allocated downstream node in the enlarged wireless token ring system 2.

Since the moving node 13 is now aware of its allocated downstream node 21, the token T' (see FIG. 9) that is sent by the handover control node 20 of the wireless token ring system 2 to the moving node 13, does not have to comprise any indication as to the allocation of nodes in the enlarged wireless token ring system 2.

Figure 10:
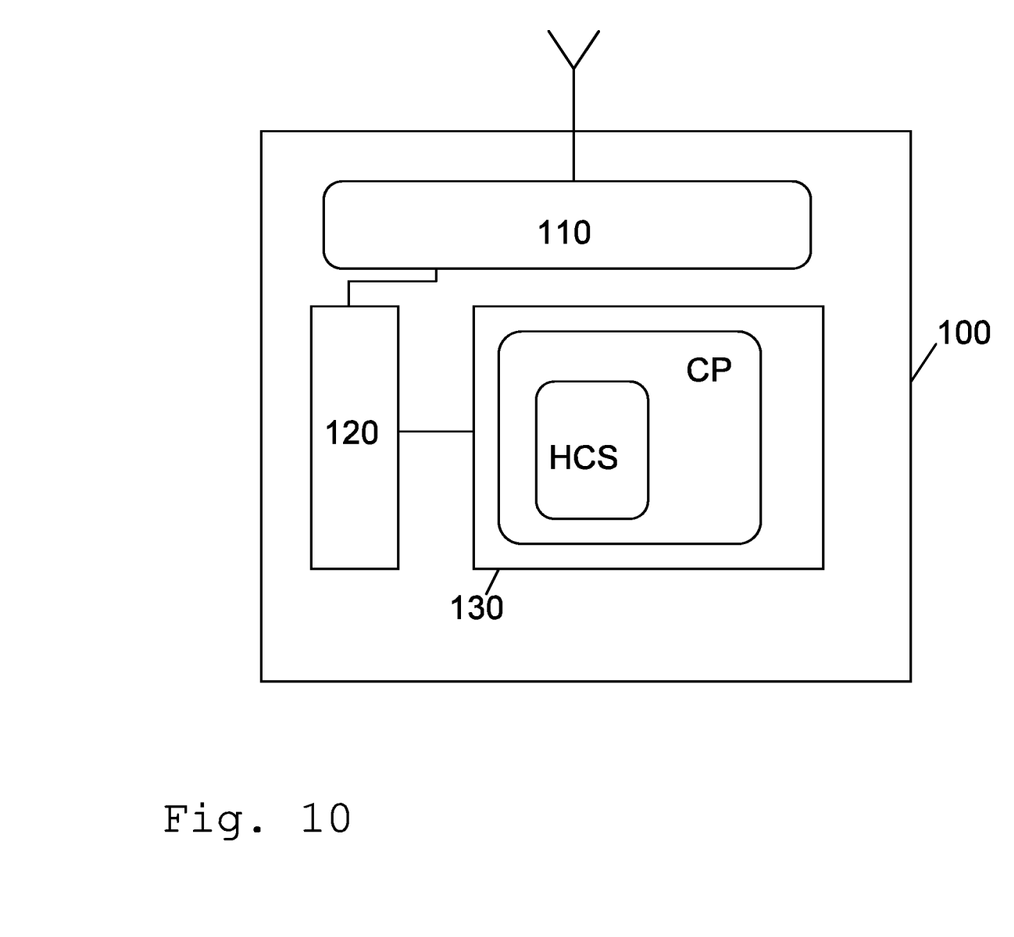
FIG. 10 illustrates an exemplary embodiment of a communication node that can be operated as a handover control node in the arrangement shown in FIGS. 1-9.

FIG. 10 illustrates an exemplary embodiment of a communication node 100 that can form any of the communication nodes 10-13 and 20-21 in the communication systems 1 and 2 of FIGS. 1-9.

The communication node 100 comprises a transceiver 110 capable of transmitting and receiving electromagnetic radiation, a processor unit 120 and a memory 130. The memory 130 stores a control program CP that allows the processor unit 120 to operate as explained above.

The control program CP comprises a handover control software module HCS which—after activation—programs the processor such that the communication node may act as a handover control node 20 as described above. For instance, the handover control node 100 may address its next token to a moving node 13 and not to its formerly allocated downstream communication node 21 after receiving a handover message HOM that indicates the initiation of the handover process with respect to the moving node 13. Further, the handover control node 100 may send a replacement token RT to the allocated downstream node 21 of the moving node 13 in case that the handover control node 20 does not receive an acknowledgement (e. g. an acknowledgment signal A or a token T) from the moving node 13 in a given period of time.

The embodiments described above with reference to FIGS. 1 to 10 differ from the method described in the above mentioned thesis "WTRP—Wireless Token Ring Protocol" at least with regard to the handover message. The handover message according to the exemplary embodiments of FIGS. 1 to 10 is sent from the first communication system to the second communication system in order to notify the second communication system about the intended handover process and announce the moving node. The handover message enables the handover control node of the second communication system to allow the announced moving node to move seamlessly and interruption-free from the first communication system to the second communication system.

In other words, the handover control node of the second communication system awaits the arrival of the moving node and seamlessly executes the integration of the moving node upon arrival. This seamless integration which is the basis for session continuity on higher communication layers—referred to as "handover" with respect to FIGS. 1 to 10—is possible because of the prior transmission of handover information (handover message) from the first communication system towards to the second communication system.

In contrast, the "solicit successor token" of the thesis is sent within the second system, only. The "solicit successor token" is meant for any node that can hear it, and therefore allows any arbitrary node to join the network. In other words, the "solicit successor token" potentially enables any node to enter the network and is not limited to a pre-defined moving node that has been and announced earlier by the first communication system.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the word "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

The invention claimed is:

1. A method of carrying out a handover process between a first communication system and a second communication system,
   wherein the second communication system is a wireless token ring system and at least one communication node of the wireless token ring system operates as a handover control node,
   wherein a communication node, hereinafter referred to as the moving node, of the first communication system leaves the first communication system and is integrated into the wireless token ring system thereby transforming the original wireless token ring system into an enlarged wireless token ring system,
   wherein after receiving a handover message that indicates the initiation of the handover process with respect to the moving node, the handover control node addresses its next token to the moving node and not to its formerly allocated downstream node in the original wireless token ring system, and
wherein the method further comprises the following steps:
   Step (a) in case that the moving node receives said token and sends thereafter an acknowledgement to the handover control node and an own token to its allocated downstream node in the enlarged wireless token ring system, the handover process is deemed to be completed and the moving node forms the newly allocated downstream node to the handover control node in the enlarged wireless token ring system, and
   Step (b) in case that the handover control node does not receive the acknowledgement in a given period of time, the handover control node sends a replacement token to the allocated downstream node of the moving node, the replacement token replacing the presumably missing token of the moving node and allowing the token ring communication to proceed, and
wherein steps (a) and (b) are repeated until the handover control node receives the acknowledgement from the moving node or until the handover process is deemed to have failed and is aborted.

2. An arrangement comprising at least two communication systems, characterized in that
   at least one of the communication systems is a wireless token ring system, and at least one of the communication nodes of the wireless token ring system is configured to act as a handover control node according to the method defined in claim 1.

3. A wireless token ring system according to the arrangement of claim 2, wherein a handover control node is configured
   to address its next token to a moving node and not to its formerly allocated downstream communication node in the original wireless token ring system, after receiving a handover message that indicates the initiation of the handover process with respect to the moving node, and
   to send a replacement token to the allocated downstream node of the moving node, in case that the handover control node did not receive an acknowledgement from the moving node in a given period of time,
   wherein the replacement token allows the token ring communication to proceed.

4. A communication node for a wireless token ring system, wherein said the communication node is configured to act as a handover control node according to the method defined in claim 1.

5. A communication node for a wireless token ring system, wherein the communication node is a handover control node configured
   to address its next token to a moving node and not to its formerly allocated downstream communication node in the original wireless token ring system, after receiving a handover message that indicates the initiation of the handover process with respect to the moving node, and
   to send a replacement token to the allocated downstream node of the moving node in case that the handover control node did not receive an acknowledgement from the moving node in a given period of time,
wherein the replacement token allows the token ring communication to proceed; wherein the communication node is configured to act as a handover control node according to the method defined in claim 1.

6. A communication node according to claim 5, wherein the communication node comprises
   a transceiver,
   a processor and
   a memory that stores a handover control software module which—after activation—programs the processor such that the communication node acts as the handover control node.

7. A method of carrying out a handover process between a first communication system and a second communication system,
   wherein the second communication system is a wireless token ring system where each communication node is configured to send signals to an allocated upstream communication node and receive signals from an allocated downstream communication node and where at least one communication node of the wireless token ring system operates as a handover control node,
   wherein in order to initiate an integration of a moving node of the first communication system into the wireless token ring system and thereby transform the original wireless token ring system into an enlarged wireless token ring system, a handover message is sent from the first communication system to the wireless token ring system,
   wherein after receiving the handover message that indicates the initiation of the handover process with respect to the moving node, the handover control node of the wireless token ring system addresses its next token to the moving node and not to its formerly allocated downstream node in the original wireless token ring system, and
wherein the method further comprises the following steps:
   Step (a) in case that the moving node receives said token and sends thereafter an acknowledgement to the handover control node and an own token to its allocated downstream node in the enlarged wireless token ring system, the handover process is deemed to be completed and the moving node forms the newly allocated downstream node to the handover control node in the enlarged wireless token ring system, and
   Step (b) in case that the handover control node does not receive the acknowledgement in a given period of time, the handover control node sends a replacement token to the allocated downstream node of the moving node, the replacement token allowing the token ring communication to proceed, and
wherein steps (a) and (b) are repeated until the handover control node receives the acknowledgement from the moving node or until the handover process is deemed to have failed and is aborted.

8. The method of claim 7 wherein, in step (a) the acknowledgement and the moving node's own token are separate signals that are sent simultaneously or consecutively by the moving node.

9. The method of claim 7 wherein, in step (a), the moving node's own token itself forms the acknowledgement, and
   wherein the handover control node accepts the receipt of the moving node's own token as the receipt of the acknowledgement.

10. The method according to claim 7, wherein said next token of the handover control node indicates to the moving node which node of the wireless token ring system will be its allocated downstream node in the enlarged wireless token ring system.

11. The method according to claim 7, wherein in each of the two communication systems, at least one node operates as a handover control node, the handover control node of the first communication system is hereinafter referred to as first handover control node and the handover control node of the wireless token ring system is hereinafter referred to as second handover control node.

12. The method of claim 11, wherein the first handover control node sends the handover message that indicates the initiation of the handover process with respect to the moving node, to the second handover control node.

13. The method according to claim 11, wherein after receiving the handover message, the second handover control node sends a configuration message to the first handover control node which forwards the configuration message to the moving node, and
   wherein said configuration message indicates to the moving node which node of the wireless token ring system will be its allocated downstream node in the enlarged wireless token ring system.

14. The method according to claim 7, wherein upon receipt of the handover message the handover control node of the wireless token ring system sends an enlargement information that indicates the enlargement of the wireless token ring system to the communication nodes of the wireless token ring system.

15. The method according to claim 7, wherein upon receipt of the handover message the handover control node of the wireless token ring system sets a new timing schedule and sends the new timing schedule to the communication nodes of the wireless token ring system, and wherein the new timing schedule defines the timing demands that have to be met by the communication nodes in the enlarged wireless token ring system.

16. The method according to claim 7, wherein in each rotation period, each communication node of the first communication system directly or indirectly—for example, via one or more other communication nodes that function as relay nodes—sends a token to an allocated downstream communication node of the first communication system and receives a token from an allocated upstream communication node of the first communication system, and
  wherein in each rotation period, each communication node of the wireless token ring system directly or indirectly—for example, via one or more other communication nodes that function as relay nodes—sends a token to an allocated downstream communication node of the wireless token ring system and receives a token from an allocated upstream communication node of the wireless token ring system.

17. A communication node for a wireless token ring system, wherein the communication node is a handover control node configured
  to address its next token to a moving node and not to its formerly allocated downstream communication node in the original wireless token ring system, after receiving a handover message that indicates the initiation of the handover process with respect to the moving node, and
  to send a replacement token to the allocated downstream node of the moving node in case that the handover control node did not receive an acknowledgement from the moving node in a given period of time,
  wherein the replacement token allows the token ring communication to proceed.

* * * * *